(12) United States Patent
Lee et al.

(10) Patent No.: US 8,574,695 B2
(45) Date of Patent: Nov. 5, 2013

(54) BIODEGRADABLE COMPOSITE BARRIER FILM

(75) Inventors: Mark Lee, North Kingstown, RI (US);
Nao Yokota, Saunderstown, RI (US);
Keunsuk P. Chang, North Kingstown, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 337 days.

(21) Appl. No.: 12/894,647

(22) Filed: Sep. 30, 2010

(65) Prior Publication Data
US 2011/0081543 A1   Apr. 7, 2011

Related U.S. Application Data

(60) Provisional application No. 61/253,918, filed on Oct. 22, 2009, provisional application No. 61/248,290, filed on Oct. 2, 2009.

(51) Int. Cl.
| | |
|---|---|
| B32B 15/08 | (2006.01) |
| B32B 15/09 | (2006.01) |
| B32B 15/20 | (2006.01) |
| B32B 18/00 | (2006.01) |
| B32B 27/08 | (2006.01) |
| B32B 27/36 | (2006.01) |

(52) U.S. Cl.
USPC ........ 428/35.8; 428/35.7; 428/36.6; 428/446; 428/457; 428/458; 428/480; 428/346; 428/347; 428/349; 525/437; 525/444

(58) Field of Classification Search
None
See application file for complete search history.

(56) References Cited

U.S. PATENT DOCUMENTS

| | | | | |
|---|---|---|---|---|
| 4,493,872 A | * | 1/1985 | Funderburk et al. | 428/332 |
| 4,704,325 A | * | 11/1987 | Crocker | 428/323 |

(Continued)

FOREIGN PATENT DOCUMENTS

| | | | |
|---|---|---|---|
| JP | 08-118537 | * | 5/1996 |
| JP | 08-118537 A | | 5/1996 |

(Continued)

OTHER PUBLICATIONS

Natureworks, LLC, NWPKG0380205V2 Crystallizing and Drying of PLA, from website http://www.natureworksllc.com/product-and-applications/ingeo-biopolymer/technical-resources/~/media/product%20and%20applications/ingeo%20biopolymer/technical%20resources/processing%20guides/processingguides_crystallizinganddryingpla_pdf.ashx, downloaded Aug. 24, 2010, 11 pp.

*Primary Examiner* — Vivian Chen
(74) *Attorney, Agent, or Firm* — Jeffrey C. Lew

(57) ABSTRACT

The present invention is directed to a multilayer film having, as its main component, a hydroxy acid polymer with improved gas barrier and optional heat sealability. The oriented film of predominately hydroxy acid polymer having controlled shrink can be produced by melting and coextruding a hydroxy acid polymer with a much thinner layer of an amorphous aromatic copolyester to form a multilayer film that is quench cooled, then biaxially stretched at a process temperature above the glass transition and below the cold crystallization temperature of the hydroxy acid polymer. A heat-setting treatment with a controlled relaxation of the film above the hydroxy acid polymer glass transition temperature and below its melt temperature may be used to control shrinkage. The films thus obtained are vacuum metallized on the aromatic copolyester surface to produce environmentally friendly packaging from predominately renewable resources having improved gas barrier properties.

17 Claims, 4 Drawing Sheets

(56) References Cited

U.S. PATENT DOCUMENTS

| | | | |
|---|---|---|---|
| 4,845,189 A * | 7/1989 | Rudd et al. | 528/272 |
| 4,921,764 A * | 5/1990 | Rudd et al. | 428/480 |
| 5,216,050 A * | 6/1993 | Sinclair | 524/108 |
| 5,508,075 A * | 4/1996 | Roulin et al. | 428/35.7 |
| 5,527,622 A | 6/1996 | Kato et al. | |
| 5,888,648 A * | 3/1999 | Donovan et al. | 428/349 |
| 6,004,660 A * | 12/1999 | Topolski et al. | 428/212 |
| 6,153,276 A * | 11/2000 | Oya et al. | 428/35.2 |
| 6,248,430 B1 * | 6/2001 | Toyoda et al. | 428/213 |
| 6,312,823 B1 * | 11/2001 | El-Afandi et al. | 428/480 |
| 6,338,870 B1 * | 1/2002 | Jaccoud | 427/171 |
| 6,607,815 B2 * | 8/2003 | Bartsch et al. | 428/216 |
| 6,844,077 B2 * | 1/2005 | Squier et al. | 428/457 |
| 6,869,985 B2 * | 3/2005 | Mohanty et al. | 523/124 |
| 6,908,652 B1 * | 6/2005 | Miranda et al. | 428/36.7 |
| 7,220,815 B2 * | 5/2007 | Hayes | 528/272 |
| 7,368,160 B2 * | 5/2008 | Inglis | 428/212 |
| 7,390,558 B2 * | 6/2008 | Aritake et al. | 428/212 |
| 7,413,800 B2 * | 8/2008 | Wood et al. | 428/331 |
| 7,427,435 B2 * | 9/2008 | Posey | 428/195.1 |
| 7,705,078 B2 * | 4/2010 | MacDonald et al. | 524/403 |
| 7,754,813 B2 * | 7/2010 | Murakami et al. | 525/191 |
| 7,943,218 B2 * | 5/2011 | Knoerzer et al. | 428/35.4 |
| 7,951,438 B2 * | 5/2011 | Lee et al. | 428/35.8 |
| 7,972,193 B2 * | 7/2011 | Sarnstrom et al. | 446/220 |
| 8,133,562 B2 * | 3/2012 | Ito et al. | 428/36.9 |
| 8,143,340 B2 * | 3/2012 | Hong et al. | 524/496 |
| 8,236,399 B2 * | 8/2012 | Chicarella et al. | 428/35.7 |
| 8,252,421 B2 * | 8/2012 | Arai et al. | 428/423.1 |
| 8,268,918 B2 * | 9/2012 | Fukawa et al. | 524/161 |
| 2001/0046574 A1 | 11/2001 | Curtis | |
| 2004/0138377 A1 | 7/2004 | Matsuoka et al. | |
| 2005/0154114 A1 * | 7/2005 | Hale | 524/436 |
| 2005/0171250 A1 * | 8/2005 | Hayes | 524/47 |
| 2006/0216805 A1 * | 9/2006 | Ueda | 435/174 |
| 2006/0222845 A1 * | 10/2006 | Deng et al. | 428/336 |
| 2008/0038560 A1 * | 2/2008 | Knoerzer et al. | 428/411.1 |
| 2008/0160327 A1 | 7/2008 | Knoerzer et al. | |
| 2009/0148713 A1 * | 6/2009 | Lee et al. | 428/458 |
| 2009/0148715 A1 * | 6/2009 | Lee | 428/480 |
| 2010/0040904 A1 * | 2/2010 | Cloutier et al. | 428/626 |

FOREIGN PATENT DOCUMENTS

| | | | |
|---|---|---|---|
| JP | 9-300522 A | | 11/1997 |
| JP | 2000318092 A | | 11/2000 |
| JP | 2001-162711 | * | 6/2001 |
| JP | 2001205767 A | | 7/2001 |
| JP | 2002210883 A | | 7/2002 |
| JP | 2003-300272 | * | 10/2003 |
| WO | WO 2008/035557 | * | 3/2008 |

* cited by examiner

Comp Ex 2 - 3 weeks

Comp Ex 2 - 21 weeks

Ex 1 - 3 weeks

Ex 1 - 21 weeks

Ex 10 - week 3     Ex 10 - week 21

Ex 6 - week 3     Ex 6 - week 21

Ex 8 - week 3    Ex 8 - week 21

US 8,574,695 B2

BIODEGRADABLE COMPOSITE BARRIER FILM

This application claims benefit of U.S. provisional patent application No. 61/253,918 filed Oct. 22, 2009, and U.S. provisional patent application No. 61/248,290 filed Oct. 2, 2009.

FIELD OF THE INVENTION

This invention relates to a biodegradable multilayer film with excellent barrier properties suitable for food packaging. More specifically it relates to a composite having a poly (hydroxy acid) core layer, an at least 90% amorphous, aromatic copolyester barrier receiving layer and an inorganic barrier layer in that order.

BACKGROUND OF THE INVENTION

The packaging industry, the plastic industry as a whole and society is becoming more concerned with the environmental impact of raw material resources and product disposal. Polylactic acid (PLA) is biodegradable and advantageously can be derived from renewable raw material sources. PLA films are biodegradable under some natural conditions and under more controlled industrial composting conditions. Use of PLA has enabled industry to addressed environmental concerns so successfully that it is one of the largest commercially successful plastics based on a renewable material source.

One disadvantage of polylactic acid, particularly as a packaging film or of films made from similar polyhydroxy acid materials, is its relatively poorer resistance to moisture vapor transmission compared to oil based plastics. The relatively high moisture permeability leads to shorter shelf life of certain packaged goods. To improve the moisture barrier resistance of hydroxy acid polymer films and thus improve their packaging performance, these films are often coated with a very thin layer of a good moisture barrier material. The resulting coated film has dramatically improved moisture vapor transmission resistance when such coatings as inorganic barrier materials of aluminum or the oxides of aluminum or silicon are used.

Notwithstanding the great strides taken to improve moisture vapor transmission by adding the barrier material coating, further problems remain. It is desirable to further improve the moisture barrier properties of packaging films so that shelf life of the packaged product can be extended for greater convenience and economy of the consumer. Moreover, a need exists to provide the further improved barrier properties without significantly adding to the mass, cost or reduction in biodegradability or renewability of the packaging film. It is also desired to achieve the production of an improved moisture vapor transmission resistant biodegradable film with least disruptive modification of existing equipment and techniques currently in place throughout the packaging film industry.

U.S. patent application Ser. No. 11/464,331 describes multi-layer packaging film structures bio-based films, adhesive, and a barrier film layer wherein the bio-based film comprises polylactic acid and/or polyhydroxyalkanoate. The application mentions that PET can be coextruded with PLA but no details or enablement is given as to what type of PET should be used (i.e. crystalline or amorphous), formulations, or expected improvements, benefits, or properties of such a coextrusion.

U.S. patent application Ser. No. 12/332,153 describes high moisture barrier polylactic acid films coextruded with poly-olefins such as polypropylene and/or tie-resin blends as a metal receiving layer. However, the application does not contemplate using amorphous polyesters as a metal receiving layer coextruded with PLA for improving moisture barrier properties.

U.S. Pat. No. 7,368,160 discloses a co-extruded BOPLA film displaying improved winding and manufacturability and end-user performance. U.S. Pat. No. 6,600,008 discloses an aliphatic polyester film and gas barrier film having specific surface, thermal and orientation properties for packaging applications. U.S. Pat. No. 7,390,558 discloses a primer-coated biaxially oriented aliphatic polyester film having an amorphous skin layer and its inorganic deposited film having about 3 to 5 cc/m2/day of oxygen gas permeability.

U.S. patent application Ser. No. 12/542,428 describes using a unique sputtering type of treatment on PLA substrates to "seed" the PLA surface with Cu or Ni sites for subsequent metal deposition of aluminum for improving metal adhesion and barrier properties. This reference is incorporated in this application.

However, these prior arts do not disclose enough nor are sufficient to achieve the objectives of this invention as described below.

SUMMARY OF THE INVENTION

This invention is largely based on the discovery that the moisture barrier of selective barrier-coated films, such as aluminum coated films, of hydroxy acid polymer can be further improved by applying a thin aromatic copolyester layer as a barrier receiving surface on the polyhydroxy acid film. Advantageously, the process for making the novel film is fully compatible with equipment and operating procedures utilized to produce conventional biaxially oriented polyhydroxy acid film. Additionally, the thin aromatic copolyester layer provides good optical properties which maintains desirable aesthetic appearance to the product film.

Accordingly, the present invention provides a multi layer film comprising (i) a core layer comprising a major fraction by weight of a poly(hydroxy acid), (ii) a polymeric barrier receiving ("PBR") layer adjacent to one side of the core layer and comprising a major fraction by weight of an amorphous aromatic copolyester, and (iii) a barrier layer adjacent the PBR layer opposite the core layer, the barrier layer comprising as a major fraction by weight an inorganic compound, in which the poly(hydroxy acid) is at least about 85% by weight of the total of poly(hydroxy acid) and amorphous aromatic copolyester.

DETAILED DESCRIPTION OF THE INVENTION

Figure 1:
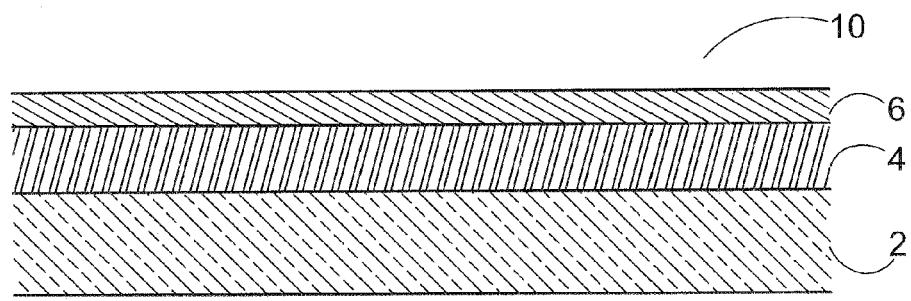
FIG. 1 is an elevation crossection view of a multilayer film according to an embodiment of the present invention.

With reference to FIG. 1 it is seen that in one embodiment the novel multilayer biodegradable barrier film 10 includes a core layer 2 comprising a polyhydroxy acid and a polymeric barrier receiving layer ("PBR") 4 adjacent to one side of the core layer. Composition of the PBR layer includes mainly an amorphous aromatic copolyester. Adjacent to the PBR layer and on the side opposite the core layer is positioned a barrier layer 6 comprising an inorganic compound. The barrier layer primarily provides high gas transmission resistance, especially moisture vapor transmission resistance.

In an important aspect of this invention, the novel film is substantially biodegradable. The meaning of the term "biodegradable" as applied to packaging film and similar materials in the current state of the art is often ill-defined. Broadly it means that a manufactured substance is digested under environmentally ambient conditions by enzymes exuded by bacteria present in the natural environment such that the substances break down to environmentally benign compounds. A minimum rate and/or extent to which a substance degrades to identify the substance as biodegradable is presently not universally recognized. Certain laboratories and certification entities have begun to test the biodegradation property of materials to permit the establishment of standards for identifying biodegradability. Under the present state of the art, it is understood that polyhydroxy acid chemical composition is among those with the highest degree and most rapid rate of biological degradation, (i.e., they degrade nearly completely in the shortest time of bacterial exposure).

The multilayer film of this invention comprises a core layer having a major fraction of polyhydroxy acid. However, the polymeric barrier receiving layer (and optional heat seal layer, explained below) of the film is largely composed of an aromatic copolyester. This type of polymer is generally recognized as being slow to decompose by bacterial degradation and therefore is not biodegradable. In view that the core layer is the predominant component by mass, the novel film is thus highly, if not completely, biodegradable.

The barrier layer comprises inorganic compounds. While not biodegradable in the sense of being subject to bacterial decomposition, the mass fraction of the barrier layer is minor and the barrier layer typically shreds by natural mechanical environmental activity and disperses unobjectionably in the environment when the underlying substrate degrades. Thus the inorganic content is considered to only negligibly affect the biodegradable character of the film. Consequently, the term "substantially biodegradable" as used herein, means that the novel film degrades by natural environmental biological mechanisms to an extent and at rate close to those of recognized completely biodegradable materials.

Figure 2:
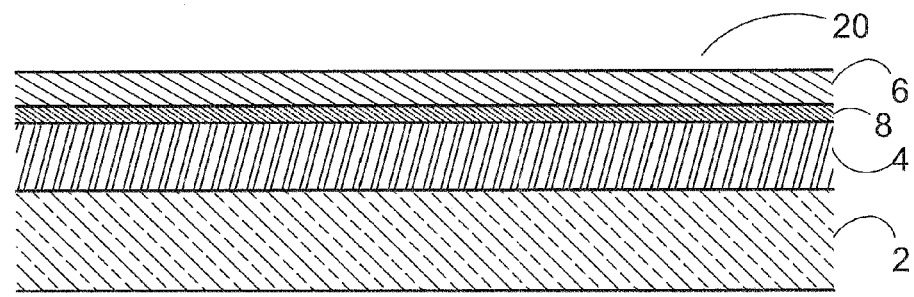
FIG. 2 is an elevation crossection view of a film having a metal barrier layer and incorporating a metal seeding layer intermediate the core layer and the barrier layer according another embodiment of the present invention.

FIG. 2 shows a multilayer film 20 according to another embodiment of the invention. In this embodiment the inorganic compound includes a metal. In such case, it can be beneficial to incorporate a metal seeding layer 8 intermediate the PBR layer 4 and the barrier layer 6 as seen in FIG. 2. The metal seeding layer comprises predominantly a metal element which facilitates adhesion of the barrier layer to the PBR layer. On average, the metal seeding layer is present in the multilayer film in amount of about 0.1-0.5 mg/m². Thus it is ultra thin. By the term "ultra thin" is meant thickness of at most 100 Å. The metal seeding layer can be applied in such a way that it is not necessarily continuous. That is, upon application, the metal seeding layer may appear non-existent in bare spots on the PBR surface. The bare spots constitute at most a minor fraction of the surface area where the barrier layer can be in direct contact with the PBR. When the metal seeding layer is present it can enhance the vapor transmission resistance of the film in addition to merely improving adhesion between the PBR layer and the barrier layer 6.

Figure 3:
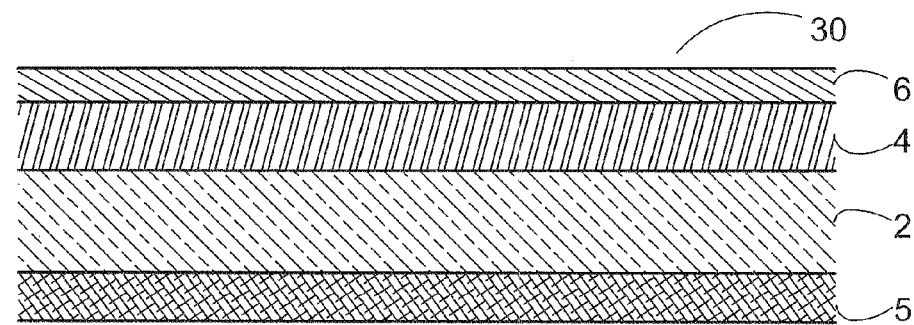
FIG. 3 is an elevation crossection view of a film having a heat sealing layer on a side of the film opposite the barrier layer according to another embodiment of the present invention.

FIG. 3 illustrates another embodiment 30 of the novel multilayer film in which an additional heat seal layer 5 is present. The heat seal layer primarily provides a thermally activated adhesive function for bonding the film surface to itself or another surface. The additional layer is positioned on a side of the film opposite from barrier layer 6. In the illustrated embodiment, the additional layer is adjacent to core layer 2, and a PBR layer 4 is positioned intermediate and in direct contact with the core layer and the barrier layer. In another aspect of this invention, there can be more than one other additional layer (not shown) which provide different functions for the composite supplemental to the heat seal layer 5 function. Such other additional layers are positioned on a side of the film opposite the barrier layer and intermediate the core layer 2 and the heat seal layer. Thus the heat seal layer 5 is the farthest of the additional layers from the core layer.

Heat Seal

Ideally the heat seal layer has melt flow characteristics that enable it to be melt processed and formed as a layer in the composite by coextrusion with the other layers of the film. Also to accomplish heat sealing, this layer is composed of mostly polymeric material which can be thermally activated in a temperature range permitting the heat seal layer to adhere to itself or other substrates without adversely affecting the structure or properties of the film. Of course, if the heat seal layer activates at too low a temperature it would be susceptible to blocking when exposed to warm ambient temperatures for example such as exist in warehouses during storage in hot climate locations. Preferably the heat seal layer will activate at temperatures in the range of about 50-90° C.

Preferably the polymeric material of the heat seal layer is also a predominantly amorphous aromatic copolyester. The polymer can have a small amount of crystallinity, provided that the heat seal layer exhibits a relatively low melting, (i.e., melting point between about 50-90° C.). Crystallinity of the amorphous aromatic copolyester in the heat seal layer should be low, that is, preferably below about 10 wt %. Composition of the amorphous aromatic copolyester of the heat seal layer can be the same as or different from the amorphous aromatic copolyester of the PBR layer.

For utilities in which more rapid and complete biodegradability is desired, the polymeric material of the heat seal layer also can be a polyhydroxy acid. Preference is given to mainly amorphous polyhydroxy acid polymer; however, any polyhydroxy acid composition that is melt processable together with the polymers of the core layer and the PBR layer should be suitable.

Core Layer

A major weight fraction (i.e., greater than 50 wt %) of the core layer of the film comprises polyhydroxy acid. The terms "polyhydroxy acid", "hydroxy acid polymer" and cognate terms are occasionally referred to herein as "PHA" and are meant to be equivalent and interchangeable. The core layer comprises preferably at least about 80 wt %, more preferably at least about 90 wt % and most preferably at least about 95 wt % of polyhydroxy acid. Preferred polyhydroxy acid compositions are aliphatic polyesters. Representative of the preferred aliphatic polyesters are copolymers and polymer blends of poly(lactic acid), poly(lactide), poly(glycolide), poly(hydroxy butyrate), poly(hydroxy butyrate co hydroxy valerate), poly(caprolactone), poly(ethylene-oxylate), poly (1,5-dioxepan 2-one), poly(1,4-dioxepan 2-one), poly(p-dioxanone), poly(delta-valerolactone), and poly(trimethylene carbonate). Aliphatic polyesters have ability to hydrolyze to generally biodegradable units. It should be appreciated that lactic acid residue containing polymers such as poly(lactide) and poly(lactic acid) are preferred hydroxy acid polymers because i.a., they are biodegradable, including compostable, and they can be produced from renewable source materials. Other copolymers prepared from lactide or lactic acid and epoxidized multifunctional oil, such as soybean oil or linseed oil are also suitable.

Most preferably, the core layer comprises as its major component a polylactic acid resin. The polylactic acid resin refers to a polymer containing L-, D- or DL-lactic acid or hydroxycarboxylic acids, aliphatic dicarboxylic acids, and/or aliphatic diols.

PBR Layer:

It has been discovered that the barrier properties of a metalized polyhydroxy acid composite can be significantly enhanced by interposing a certain polymeric barrier receiving (PBR) layer between the metal and PHA layers. More specifically, the PBR layer contains as a major component an amorphous aromatic copolyester.

The term "amorphous aromatic copolyester" refers to copolyesters incorporating an aromatic ring structure. The copolyesters exhibit a high glass transition temperature (Tg) preferably above about 50° C., more preferably above about 60° C., and still more preferably above about 70° C. The term "copolyester" is used herein to mean that the repeating units of the polyester include more than a single dicarboxylic acid precursor and a single diol precursor. That is, the repeating units should include a first dicarboxylic acid derivative, a first diol derivative and at least one additional dicarboxylic acid derivative or diol derivative different from the first respective derivative. Accordingly, embodiments of the copolyester can have (a) plural dicarboxylic acid derivatives and one or more diol derivatives, or (b) plural diol derivatives and one or more dicarboxylic acid derivatives.

Significantly the components of the aromatic copolyester should be selected to provide a polymeric composition that has substantial amorphous morphology. Acceptable amorphous structure with high Tg usually occurs when an aromatic component is used. Thus one of the dicarboxylic acid or diol derivative components is an aromatic. The particular aromatic component is not critical and any known in the art should be useful. For example, the aromatic dicarboxylic acid moiety may be terephthalic acid, isophthalic acid, naphthalene dicarboxylic acid (such as dimethyl-2,6-naphthalene dicarboxylic acid), dibenzoic acid, or ester derivatives thereof. Other aromatic and non-aromatic di-acid and di-ester components can be present in addition to the one aromatic dicarboxylic acid or derivative component. These include diacids, such as adipic, azelaic, sebacic, and aliphatic dicarboxylic acids including unsubstituted, substituted, linear, and branched, aliphatic dicarboxylic acids (e.g., 1,4-cyclohexanedicarboxylic acid) and the lower alkyl esters of aliphatic dicarboxylic acids having 2 to 36 carbon atoms, substituted napthalene dicarboxylic acids or the ester derivatives thereof.

Without wishing to be bound by a particular theory, it is contemplated that aromatic copolyesters having nonlinear ring substituents (i.e., 1,3-"iso-" or 1,2-"ortho-" rather than 1,4-"para-" substitutions) provide superior amorphous morphology. Therefore, preferred aromatic dicarboxylic acids have phthaloyl structure. It has been found useful as a method of engendering sufficient amorphism to incorporate multiple diacids and/or multiple diols in the polymerization mixture of the aromatic dicarboxylic acid/ester derivative. The mixture of diverse component moieties interferes with crystalline structure formation. Preferably a mixture of two or more dicarboxylic moieties should be present with at least one of them being isophthaloyl. Representative isophthaloyl and orthophthaloyl aromatic components include isophthalic acid, 1,3-dimethyl isophthalate, and 1,2 dimethyl phthalate. Polyethylene terephthalate-co-isophthalate is an especially preferred amorphous aromatic copolyester.

The composition of the diol component is not critical and some conventional diols utilized in the polyester synthesis art may be used. It is desirable to use the diol component to reduce the crystalline content and melting point of the copolyester while maintaining the Tg in the preferred range. This can be accomplished either by incorporating aromatic diol as the sole aromatic component by combining aromatic diol with at least one aromatic diacid. Representative examples of suitable diols include ethylene glycol, 1,4-butanediol, 1,2-butanediol, diethylene glycol, propanediol, polyethylene glycol, polytetramethylene glycol, neopentyl glycol, cyclohexane dimethanol, 4-hydroxy diphenol, bisphenol A, 1,8-dihydroxy biphenyl and a combination thereof.

In one aspect, the present invention relates to the discovery that a thin, mostly amorphous aromatic copolyester PBR layer disposed on a surface of a mostly PHA core layer between the latter and an inorganic barrier layer provides significantly improved resistance to moisture vapor transmission compared to the core layer/inorganic barrier layer composite. In a preferred embodiment, the polymer of the PBR layer is exclusively amorphous aromatic copolyester. Serendipitously such a composition desirably provides good adhesion between the PHA composition of the core layer and the inorganic composition of the barrier layer. The preferred route to making such highly moisture-resistant composites includes coextruding the PHA and PBR layers in mainly conventional processing equipment such as continuous melt-mixing extruders with coextrusion dies. It has been found somewhat disappointingly, that such processing results in irregularly textured coextrudate film precursor with a lumpy, aesthetically unappealing appearance. The rough, non-uniform precursor core layer/PBR layer coextrudate is difficult to handle on film transport, stretch orientation and wind-up equipment since it tends to curl.

It has been further discovered that blending a substantial concentration of PHA, preferably amorphous PHA, with the amorphous aromatic copolyester of the PBR layer provides superior moisture vapor transmission without developing adverse precursor coextrudate non-uniformity. Advantageously, this composition change increases the biodegradability of the PBR layer, and thus, the whole film composite. However, a slight drawback is that the core layer of PHA together with a PBR layer composition of amorphous PHA/amorphous aromatic copolyester blend, for example, at about 50 wt % amorphous PHA, exhibits significant haze and a matte surface finish. These characteristics are undesirable in many film product utilities. In another aspect of this invention, the PBR layer can be a blend of polymeric materials in which the amorphous aromatic copolyester is present greater than 50 wt %, preferably greater than about 80 wt %, and more preferably greater than about 90 wt %, with complemental amounts of amorphous PHA. Higher concentrations of amorphous aromatic copolyester in the PBR layer tends to reduce adhesion to the predominantly, and preferably exclusively, poly(hydroxy acid) composition of the core layer. It is contemplated that the blend of polymeric materials in the PBR layer should include a minor fraction of poly(hydroxy acid). It has been discovered that as little as about 10 wt % poly(hydroxy acid) blended into amorphous aromatic polyester is effective to provide a unique combination of desirable fabrication characteristics and composite film product properties. This composition gives a core layer/PBR layer/inorganic barrier layer composite with excellent moisture vapor transmission rate ("MVTR") and satisfactory interlayer adhesion between the PBR and core layers and between the PBR layer and the inorganic barrier layer. It also enables coextrusion of a uniform thickness, high clarity core layer/PBR layer precursor composite with pleasing appearance substantially free of lumps. This coextruded precursor is readily amenable to subsequent film handling, stretching, surface treatments and inorganic layer deposition.

The core layer, polymeric barrier receiving layer and/or heat seal layer can include additives in addition to the polymeric components described above. The additives are usually present in minor mass fraction, and preferably less than 5 wt % of the total weight of the layer in which the respective additive is present. Representative types of additives are stabilizers, antiblocking agents, biodegradation accelerants, pigments, and fillers. Typically the additives are mixed into the polymer mixture before or during melt processing to form the film, or they may be incorporated into a polymeric component during the polymerization stage. Examples of suitable stabilizers are phosphorus compounds, such as phosphoric acid or phosphoric esters. Polyhydroxy acids can be made able to biochemically degrade faster by incorporating accelerants, such as starch.

Typical antiblocking agents are inorganic and/or organic particles, e.g. calcium carbonate, amorphous silica, sodium calcium aluminum silicate, talc, magnesium carbonate, barium carbonate, calcium sulfate, barium sulfate, lithium phosphate, calcium phosphate, magnesium phosphate, aluminum oxide, lithium fluoride, the calcium, barium, zinc, or manganese salts of the dicarboxylic acids used, carbon black, titanium dioxide, kaolin, or crosslinked polymer particles such as crosslinked polystyrene particles, crosslinked polymethylmethacrylate particles, crosslinked silicone polymer particles, or crosslinked polyacrylate particles.

Two or more different antiblocking agents or mixtures of antiblocking agents of the same constitution but different particle size may be used. The particles can be added to the individual layers in conventional concentrations, e.g. in the form of monomer dispersion during polymerization, or by way of masterbatches during extrusion (or else in the form of "direct additive addition" directly into the extruder during extrusion).

In the case of a two-layer structure (in which case the film is comprised only of the core layer and one polymeric barrier receiving layer (PBR), the PBR layer should comprise a concentration of up to about 0.5% by weight of fillers, such as antiblocking agents preferably from 0.01 to 0.1% by weight of fillers, and more preferably from 0.02 to 0.06% by weight of fillers, based on the weight of the PBR layer. The core layer can comprise a concentration of from about 0.01 to about 1% by weight of fillers, preferably from about 0.04 to about 0.8% by weight of fillers, and more preferably from about 0.06 to about 0.4% by weight of fillers, based on the weight of the core layer. If the antiblock concentration in both core and PBR layers are less than 0.02% by weight, the film tends to block and consequently become difficult to process as film, such as being unable to be wound up. If the antiblocking agent concentration in the PBR layer is too high, such as more than 0.5%, it can cause the metallized film to lose its high moisture vapor transmission barrier properties which are desirable for use as packaging film.

In the case of a three-layer structure (i.e., in which the film comprises a core layer a polymeric barrier receiving layer (PBR) and a heat seal layer), the core layer preferably is free of fillers. The PBR layer preferably comprises a concentration of up to about 0.5% by weight of fillers, such as antiblocking agent, more preferably about 0.01 to about 0.1% by weight, and most preferably about 0.02 to about 0.06% by weight based on the weight of the PBR layer. The heat seal layer preferably comprises a concentration of about 0.02 to about 1% by weight of fillers, such as antiblocking agents, more preferably about 0.04 to about 0.8%, and most preferably about 0.06 to 0.4% by weight, based on the weight of the heat seal layer.

The Film-Forming Step

The novel multilayer film can be formed according to a melt coextrusion/biaxially stretching film-forming process such as the following. The raw materials for each respective layer, including resins, inorganic particles, and any other additive are dried conventionally to remove moisture. The dried materials are supplied to separate extruders, in which they are melted individually and combined as a stratified melt using two or three multi-manifolds or feed blocks according to the number of layers in the product multilayer film. The stratified melt is extruded through a slit die to produce a multilayer web or extruded through a circular die to produce a continuous, cylindrically shaped tubular product. The extrudate is solidified to an almost amorphous state by quenching with cooling cast rolls, water or pressurized air. Typically the cast web or tube is biaxially stretched by the roll method, tenter method, tubular method, etc.

In one embodiment the web can be biaxially stretched according to a successive biaxial stretching method. In such method the film is first stretched in the longitudinal, (occasionally referred to as the machine direction, or "MD") by a roll technique. This involves drawing the film by one or more downstream rollers rotating at faster rates than upstream rollers. Optionally the longitudinally stretched film can be heat treated before the subsequent stretching step. The monodirectionally stretched film is then stretched laterally in the transverse direction ("TD" or cross direction) for example by a tenter method. The film can be heat set after TD stretching. Alternatively the film can be simultaneously biaxially stretched in the longitudinal and lateral directions simultaneously by conventional techniques.

Longitudinal stretching and lateral stretching each is preferably about 1.5-6 times. To obtain desirable film strength and evenness of thickness, stretching is more preferably at least two times each longitudinal and lateral direction. Preferably area stretching ratio which is obtained by multiplying the longitudinal and lateral stretching ratios is about 6.8-36 times.

For successive biaxial stretching, the longitudinal stretching temperature is preferably 70-90° C. and the lateral stretching temperature is preferably 70-80° C. For simultaneous biaxial stretching, stretching is preferably carried out at 70-80° C. If the area stretching magnification and the stretching temperatures are not within the above said ranges, the thickness of the film tends to be excessively variable.

In order to suppress heat shrinkage of film, after biaxial stretching, it is important to carry out heat setting with the film gripped. Normally in the tenter method, since film is stretched while being gripped by a clip, it is possible to carry out heat setting immediately after stretching. The heat setting temperature is preferably in the range of 100° C. up to the melting point (Tm), of the major component of the film. The heat setting time is preferably at least 3 seconds, otherwise the heat shrinkage rate of the film obtained is too high and related problems such as handling the film during metallization, printing and lamination tend to occur. It is desirable that the heat shrinkage is at most 5% upon exposure of the film to 120°

C. for 15 minutes. If the heat setting temperature is over the melting point of the major component of the film, the film will melt during heat setting, which will break the film.

Barrier Layer

The composition of the barrier layer can be any of the inorganic compound barrier materials well known in the packaging film art. The inorganic compound can be a metal element, non-metal element, an oxide, carbide, nitride or alloy of such elements or a mixture of such substances. Preferred inorganic compounds are metal elements Al, Mg, Zn, Sn, Ni, and Ti, non-metal elements Si and C, oxides, carbides, nitrides and alloys of these elements and mixtures thereof. More preferably the inorganic compound is aluminum, an aluminum oxide ("AlOx"), silicon, a silicon oxide ("SiOx"), diamond-like carbon or a mixture thereof. Most preferably the inorganic compound is aluminum.

The method of forming the inorganic barrier layer is not particularly limited. It may be produced by using a conventional metallization technique such as vapor-deposition and coating. Vapor-deposition is preferred because it can produce a uniform thin film having a high gas-barrier property. Examples of the vapor-deposition method include physical vapor-deposition methods such as vacuum deposition, ion-plating and sputtering, and chemical vapor-deposition methods. The thickness of the inorganic barrier layer is usually about 0.1 to 500 nm. Preferably it is ultra thin, and more preferably, about 0.5 to 40 nm thick. When the thickness of the inorganic barrier layer is less than about 0.1 nm, the resultant composite film tends to have insufficient gas-barrier property. When thickness of the inorganic barrier layer is more than 500 nm, the barrier layer tends to crack, easily peels-off from the film and has poor transparency.

EXAMPLES

This invention is now illustrated by examples of certain representative embodiments thereof, wherein all parts, proportions and percentages are by weight unless otherwise indicated. All units of weight and measure not originally obtained in SI units have been converted to SI units. The entire disclosures of U.S. patents named in the following examples are hereby incorporated by reference herein.

Test methods: The following analytical methods were used in the examples to determine properties.

Optical density: Metal Optical Density is measured using a Gretag D200-II measurement device. The device is zeroed by taking a measurement without a sample in place. Then the optical density of the composite polymeric and metallic barrier layers is measured at every 7.5 cm (3 inch) across the web and the average is reported as the optical density.

Oxygen barrier was measured on a MOCON OxTran L series device utilizing ASTM D398S. Testing conditions used were 22.8° C. (73° F.), 0% relative humidity, and 1 ATM. For this type of measurement, the gas barrier surface of the metallized PLA sample before lamination is protected for testing by applying a PLA pressure sensitive adhesive (PSA) tape to the metal. The PLA/PSA tape consists of 0.02 mm (0.80 mil) biaxially oriented PLA with (0.38 mm) 1.48 mil PSA. The adhesive tape protects the gas barrier surface from handling damage, but makes no significant contribution to the oxygen barrier. Oxygen transmission rate is expressed in cc/100 in$^2$/day/atm and was measured with the metal side of the test sample oriented toward permeate side of the test cell. Preferred value for O$_2$TR for the Example films is 46.5 cc/m$^2$/day or less, and more preferably 15.5 cc/m$^2$/day or less.

Moisture Vapor Transmission Rate (MVTR): MVTR was measured with a MOCON Permatran-W 3/31 series device utilizing test method ASTM1249 and is expressed in units of g (100 in$^2$/day) at 37.8° C. (100° F.) and 90% RH. The barrier surface of the metallized PLA samples is protected from handling damage by applying a PLA/PSA tape to the metal. The PLA/PSA tape consists of 0.02 mm (0.80 mil) biaxially oriented PLA with (0.38 mm) 1.48 mil PSA. Testing is conducted with the metal side of the test sample oriented toward the permeate side of the test cell. Preferred value for MVTR of the Example films is 4.0 g/m$^2$/day or less, and preferably, 1.0 g/m$^2$/day or less.

Heat sealability: Heat seals were made by folding a single sheet of film so that both heat seal layers faced toward each other. To avoid sticking to the heat seal jaw, a 2.54 cm (1 inch) wide heat seal was made across the sample with a laboratory flat steel bar 2.54 cm×30.5 cm (1 inch"×12 inch") covered with a Teflon® coated fabric (Sentinel sealer, Sencorp) at 206 KPa (30 psi), with ½ second dwell time at the specified temperatures. Prior to peeling, the heat sealed material was cut into 2.54 cm (1 inch)" wide strips. Each end was gripped in separate jaws of a tensile tester in a "T" i.e., 90 degree configuration. The two jaws were separated at a rate of 30.5 cm/min (12 inch per minute) and the peak force was recorded.

Biodegradability: Compostability or degradability of the test films was done substantially in accordance with ASTM D6400 for "Compostable Plastics." In general, the film sample is placed in a composting medium such as mulch, grass clippings, leaf matter at a temperature of 58° C. for 26 weeks. The film is desired to be visibly gone after the test duration of 26 weeks, and preferably within 15 weeks.

Example 1

(A) Heat Seal Layer

To form a heat seal layer (A), antiblocking additive Silton® JC30 sodium calcium aluminum silicate ("JC30 CAS") of 3 µm particle size (Mizusawa Chemical) was compounded at 5 wt % into amorphous PLA resin NatureWorks 4060D utilizing a twin screw extruder with vacuum devolatilization, stranding and pelletization to produce additive masterbatch MB1. MB1 was blended at 6 wt % with NatureWorks 4060D and then dried at atmospheric pressure using 55° C. (131° F.) air with dew point −40° C. for 24 hrs or until the moisture level was below 250 ppm. The dry blend was fed to a single barrel extruder set for (199° C.) 390° F. temperature and melt kneaded to form a heat layer composition having 3000 ppm JC30 CAS in the Natureworks 4060D PLA.

(B) Core Layer

A core layer (B) composition blend of 85% NatureWorks crystalline PLA 4032 and 15% amorphous PLA NatureWorks 4060D was dried with 74° C. (165° F.) air of dew point −40 C for 24 hours or until the moisture level was below 250 ppm. This dry blend was fed to a single screw extruder and melt kneaded at temperature of 210° C. (410° F.) to form the melt core composition.

(C) Polymeric Barrier Receiving Layer

Antiblocking additive Fuji Silysia grade 310P silica ("310P silica") of 2.7 µm particle size was compounded at 10 wt % into a 19 wt % isophthalic acid/81 wt % terephthalic acid copolyester of ethylene glycol to form antiblocking masterbatch MB3. The isophthalic acid copolyester (iPET) had a solution intrinsic viscosity of 0.70 as determined from a single point measurement at 0.5 wt %. concentration in dichloroacetic acid at 25° C. The masterbatch was prepared in a twin screw extruder equipped with vacuum devolatilization and was then extruded as strand and pelletized. A polymeric barrier receiving layer (C) composition was prepared by blending 0.33 wt % MB3 and 99.67 wt % iPET then drying with 71° C. (160° F.) air of dew point −40 C, for 24 hours or until the moisture level was below 250 ppm. The dry blend was melt kneaded in a single screw extruder set at max temperature of 229° C. (445° F.) and exit temperatures of 204° C. (400'F) to form a melt barrier receiving composition of 330 ppm silica in the iPET.

Molten layer compositions were fed into a combining multilayer die set at 204° C. (400° F.) and cast onto a 21° C. (70° F.) chrome polished chill roll using electrostatic pinning. The layers were cast in the order of (A) heat seal layer/(B) core layer/(C) polymeric barrier receiving layer with the polymeric barrier receiving layer against the cooling drum. The cast film was drawn forward 2.8 times feed speed using a series of different speed and temperature rollers set at 111/138/145/draw/136/111/76° F. (44/59/63/draw/58/44/24° C.) followed by tenter preheating at 74° C. (165° F.), stretching 5 times at 88° C. (190° F.) and heat setting 138° C. (280° F.) with 5% relaxation in the TD to obtain a final biaxially oriented film with nominal 20 μm total thickness, and individual nominal layer thicknesses of (A) 2 μm/(B) 16 μm/(C) 2 μm. Nominal layer compositions of the film were (C) 330 ppm 310P silica in iPET, (B) 85% PLA 4032D/15% PLA 4060D, and (A) 3000 ppm JC30 CAS in PLA 4060D.

(D) Barrier Layer

An aluminum metal barrier layer (D) was coated onto the polymeric barrier receiving side of the composite polymer film using a conventional vacuum vapor roll process. The aluminum was applied at a thickness set to achieve an optical density of 2.6. In the metallization chamber, the exposed side of layer C of the film was plasma ($N_2$) treated. A 0.3 g/m$^2$/day value of MVTR at 38 C/90% RH was measured for the film.

Comparative Example 2

PBR Layer of Polylactic Acid

A film was produced in a manner similar to example 1 except that polymeric barrier receiving layer C was replaced with a PLA composition blend of 84.4 wt % Natureworks 4032D, 15.0 wt % Natureworks 4060D and 0.6 wt % of an additive masterbatch MB2. This additive masterbatch was prepared as described in Ex. 1 except that the carrier resin was Natureworks 4032D. The final biaxially oriented film had nominal 20 μm total thickness, and individual nominal layer thicknesses of (A) 2 μm/(B) 16 μm/(C) 2 μm. Nominal layer compositions were (C) PLA of 85% 4032D, 15% 4060D+300 ppm JC30 CAS, (B) PLA of 85% 4032D, 15% 4060D, and (A) 4060D with 3000 ppm JC30 CAS. The polymeric barrier receiving layer (C) was nitrogen plasma treated and metallized to achieve an optical density of 2.6. The resulting film provided MVTR of 1.2-2.4 g/m$^2$/day.

Example 3

A film was produced as in Example 1 except layer (A) was replaced by a blend of 98.5 wt % iPET and 1.5 wt % additive masterbatch MB3. The film had nominal 20 μm thickness with C/B/A structure with individual layer thickness as follows: polymeric barrier receiving layer (C) of about 1 μm, heat seal layer (A) of 1 μm and a core layer (B) of nominal 18 μm. Nominal layer compositions were as follows: (C) of iPET with 330 ppm 310P silica, (B) of PLA 85% Natureworks 4032D/15% Natureworks 4060D and (A) of iPET with 1500 ppm 310P silica. The film was nitrogen plasma treated and metallized on the exposed side of layer C to achieve optical density of nominal 2.4. MVTR value of about 0.30 g/m$^2$/day was obtained.

Example 4

The procedure of Ex. 3 was repeated except the flow rate from the extruder of layer (A) was increased and the flow rate from the extruder of layer (B) was reduced to adjust thicknesses of the final C/B/A, film to nominal 20 μm thickness in which individual layer thicknesses of about 1 μm/17 μm/2 μm, respectively. Nominal layer compositions were as follows: (C) 300 ppm 310P silica in iPET, (B) 85% PLA 4032D, 15% PLA 4060D, and (A) 1500 ppm 310P silica in iPET. The film was nitrogen plasma treated on the exposed surface of polymeric barrier receiving layer (C) and a metal layer was applied thereon in an amount to achieve an optical density of about 2.6. AnMVTR value of about 0.38 g/m$^2$/day was obtained.

Example 5

The procedure of Example 1 was repeated with the following changes. MB1 was blended at 3 wt % with PLA 4060D and dried. This blend was fed to a single extruder set for (199° C.) 390° F. temperature and melt kneaded to form a heat seal layer (A) composition of 1500 ppm JC30 CAS. The core layer (B) composition was prepared as a blend of 80.75 wt % PLA 4032D, 14.25 wt % PLA 4060D and 5.0 wt % Biomax® Strong 120 (toughening agent of ethylene-acrylate copolymer manufactured by Dupont). The polymeric barrier receiving layer (C) was prepared as a blend of 94.67 wt % iPET, 0.5 wt % Biomax® Strong 120, and 0.33% MB3. All melt streams were combined into a multilayered die to produce a final film of nominal 20 μm thickness having a C/B/A structure with layer thicknesses of about 1 μm/17 μm/2 μm, respectively. The nominal layer compositions were as follows: (C) 330 ppm 310P silica in 99.5% iPET/0.5% Biomax® Strong 120, (B) 80.75 wt % PLA 4032D/14.25 wt % PLA 4060D/5% Biomax® Strong 120 and (A) 1500 ppm JC30 CAS in PLA 4060D. The film sample was treated and metallized as in the previous examples to an optical density of about 2.4. An MVTR value of about 0.59 g/m$^2$/day was obtained.

Example 6

The procedure of Example 1 was repeated with the following changes. A masterbatch (MB4) of amorphous PLA Natureworks 4060D as the carrier resin at 98 wt % was made with a 2 wt % loading of Silton® JC20 sodium calcium aluminum silicate of 2 μm nominal particle size, and used in place of MB3. Layer compositions were nominal (C) 300 ppm JC20 silicate/90 wt % iPET/10 wt % PLA 4060D, (B) 85 wt % PLA 4032D/15 wt % PLA 4060D and (A) 1500 ppm JC30 CAS/100 wt % PLA 4060D. The thicknesses of each layer C/B/A were about 2 μm/16 μm/2 μm, respectively, for an overall thickness of nominal 20 μm. Processing of this film was good and no unusual issues as a result of the C Layer blend. The film sample was treated and metallized as in previous examples to an optical density of about 2.4 nominal. An MVTR value of about 0.42 g/m$^2$/day was obtained.

Example 7

Example 6 was repeated except the blend for layer C was a different ratio of PLA to iPET. MB4 at 1.5 wt % was blended with 63.5 wt % PLA 4060D and 35 wt % iPET and dried. This blend was fed to a single screw extruder set at max temperature (229° C.) 445° F. and exit temperature of 400° F. and melt-kneaded to form a barrier receiving layer (C) composition having 300 ppm JC20. A final film was formed of nominal 20 µm thickness having a C/B/A structure with layer thicknesses about 2 µm/16 µm/2 µm, respectively. Layer compositions were nominal (C) 65 wt % PLA 4060D/35 wt % iPET/300 ppm JC20, (B) 85 wt % PLA 4032D/15 wt % PLA 4060D, and (A) 100 wt % PLA 4060D/1500 ppm JC30 CAS. Processing of this variable was difficult, with severe melt disturbance and gels in the (C) layer. No sample was produced suitable for subsequent metallization.

Example 8

Example 6 was repeated except that the blend for Layer (C) was a different ratio of amorphous PLA to iPET. About 50 wt % of Layer (C) was comprised of amorphous PLA 4060D and about 50 wt % of the iPET. A final film was formed of nominal 20 µm thickness having a C/B/A structure with layer thicknesses of about 2 µm/16 µm/2 µm, respectively. Layer compositions were nominal (C) 50 wt % PLA 4060D/50 wt % iPET/300 ppm JC20; (B) 85 wt % PLA 4032D/15 wt % PLA 4060D; and (A) 100 wt % PLA 4060D/1500 ppm JC30 CAS. Processing of this variable was better than Example 7 in reduced amount of gels and melt disturbance, but film was hazier than other Examples; a sample was made for metallizing. The final film was treated and metallized to a nominal optical density of 2.4. An MVTR of about 3.72 g/m²/day was obtained, much poorer than the other Examples.

Example 9

Example 5 was repeated except as follows: the blend for layer (C) was replaced with a different amorphous polyester and antiblocking agent particle composition. The blend for layer (B) was replaced with a blend of PLA and a toughening agent. A masterbatch MB5 was compounded of about 2 wt % Silton JC20 with Eastar 6763 PETG copolyester (Eastman Chemical Co., Kingsport Tenn.). Eastar 6763 is a 30/70 mole % 1,4-cyclohexanedimethanol/ethyleneglycol terephthalate with inherent viscosity 0.7 according to Eastman Chemical method ECC-A-AC-G-V-1. The MB5 masterbatch was compounded in a twin screw extruder with vacuum devolitilization, extruded via a strand die, and pelletized.

The MB5 was blended at 1.5 wt % with 98.5 wt % Eastar 6763 and dried. This blend was fed to a single screw extruder set at max temperature (229° C.) 445° F. and exit temperature of (204° C.) 400° F. and melt-kneaded to form a polymeric barrier receiving layer (C) composition of 300 ppm JC20 in about 100 wt % Eastar 6763. Layer (B) was prepared as a blend of about 2 wt % Biomax® Strong 120, 83.3 wt % PLA 4032D, and 14.7 wt % PLA 4060D. Layer (A) was prepared as a blend of about 3 wt % MB1 with 97 wt % PLA 4060D. All melt streams were combined into a multilayered die to produce a final film of nominal 20 µm thickness having a C/B/A structure with individual layer thicknesses of about 1 µm/17 µm/2 µm, respectively. Layer compositions were nominal (C) 100% Eastar 6763/300 ppm JC20, (B) 83.3 wt % PLA 4032D/14.7 wt % 4060D/2 wt % Biomax® Strong 120 and (A) 100 wt % PLA 4060D/1500 ppm JC30 CAS. The final film was treated and metallized as in previous samples to an optical density of nominal 2.4. An MVTR value of about 0.53 g/m²/day was obtained.

Example 10

Example 1 was repeated except that the Layer (C) thickness of iPET was reduced from about 2.0 µm to about 0.5 µm in final thickness by lowering the respective satellite extruder rpms. The Layer (B) core thickness was raised (again via main extruder rpms) to about 17.5 µm to maintain an overall finished film thickness of nominal 20 µm. The Layer (A) thickness for the heat sealable layer was maintained at nominal 2 µm. A final film was formed of nominal 20 µm thickness having a C/B/A structure with layer thicknesses of about 0.5 µm/17.5 µm/2 µm, respectively. Layer compositions were nominal (C) 100 wt % iPET/330 ppm 310P silica; (B) 85 wt % PLA 4032D/15 wt % PLA 4060D; and (A) 100 wt % PLA 4060D/3000 ppm JC30 CAS. The final film was treated and metallized as in previous examples to an optical density of nominal 2.6. An MVTR value of about 0.62 g/m²/day was obtained.

Example conditions and results are presented in Table I, below.

TABLE 1

|  | Ex 1 | Comp Ex 2 | Ex 3 | Ex 4 | Ex 5 | Ex 6 | Ex 7 | Ex 8 | Ex 9 | Ex 10 |
|---|---|---|---|---|---|---|---|---|---|---|
| Film total thickness, µm | 20 | 20 | 20 | 20 | 20 | 20 | 20 | 20 | 20 | 20 |
| (A) SEAL LAYER | | | | | | | | | | |
| thickness, µm | 2 | 2 | 1 | 2 | 2 | 2 | 2 | 2 | 2 | 2 |
| PLA 4060D, wt % polymer | 100.00 | 100.00 | | | 100.00 | 100.00 | 100.00 | 100.00 | 100.00 | 100 |
| 19i/81pPET, wt % polymer | | | 100.00 | 100.00 | | | | | | |
| JC30, ppm of layer | 3000 | 3000 | | | 1500 | 1500 | 1500 | 1500 | 1500 | 3000 |
| 310P, ppm of layer | | | 1500 | 1500 | | | | | | |
| (B) CORE LAYER | | | | | | | | | | |
| thickness, µm | 16 | 16 | 18 | 17 | 17 | 16 | 16 | 16 | 17 | 17.5 |
| PLA 4032D, wt % polymer | 85.00 | 85.00 | 85.00 | 85.00 | 80.75 | 85.00 | 85.00 | 85.00 | 83.30 | 85.00 |
| PLA 4060D, wt % polymer | 15.00 | 15.00 | 15.00 | 15.00 | 14.25 | 15.00 | 15.00 | 15.00 | 14.70 | 15.00 |
| PLA 4042D, wt % polymer | | | | | | | | | | |
| Biomax Strong 120, wt % polymer | | | | | 5.00 | | | | 2.00 | |
| (C) POLYMERIC BARRIER RECEIVING LAYER | | | | | | | | | | |
| thickness, µm | 2 | 2 | 1 | 1 | 1 | 2 | 2 | 2 | 1 | 0.5 |
| 19i/81pPET, wt % polymer | 100.00 | | 100.00 | 100.00 | 99.50 | 90.00 | 35.00 | 50.00 | | 100.00 |
| Eastar 6763 PETG, wt % polymer | | | | | | | | | 100.00 | |
| PLA 4032D, wt % polymer | | 85.00 | | | | | | | | |
| PLA 4060D, wt % polymer | | 15.00 | | | | 10.00 | 65.00 | 50.00 | | |
| Biomax Strong 120, wt % polymer | | | | | 0.50 | | | | | |
| JC20, ppm of layer | | | | | | 300 | 300 | 300 | 300 | |

TABLE 1-continued

|  | Ex 1 | Comp Ex 2 | Ex 3 | Ex 4 | Ex 5 | Ex 6 | Ex 7 | Ex 8 | Ex 9 | Ex 10 |
|---|---|---|---|---|---|---|---|---|---|---|
| JC30, ppm of layer |  | 300 |  |  |  |  |  |  |  |  |
| 310P, ppm of layer | 330 |  | 330 | 330 | 330 |  |  |  |  | 330 |
| (D) BARRIER LAYER |  |  |  |  |  |  |  |  |  |  |
| metal | Al | Al | Al | Al | Al | Al | NA | Al | Al | Al |
| Optical Density | 2.6 | 2.6 | 2.4 | 2.6 | 2.4 | 2.4 | NA | 2.4 | 2.4 | 2.4 |
| MVTR g/m2/day at 38 C./90% RH | 0.30 | 5.8 | 0.30 | 0.38 | 0.59 | 0.42 | NA | 3.72 | 0.53 | 0.62 |
| Degradable in 26 weeks | No | Yes | No | No | No | No | Yes | Yes | No | Yes |

As Table 1 shows, Comparative Example 2 which is a substantially 100 wt % PLA film structure is fully compostable but its metallized moisture barrier property is poor at almost 6 g/m²/day. Example 1, which replaces the PLA metal-receiving layer with iPET, shows a significant improvement in moisture barrier of less than 1.0 g/m²/day, about 0.30 g/m²/day. However, in terms of degradability, it does not degrade fully after 26 weeks in composting conditions.

Examples 3 and 4 which are basically "C/B/C" type structures wherein a PLA core layer is sandwiched by two iPET skin layers, also shows excellent moisture barrier properties when metallized upon the metal-receiving iPET layer. However, these structures did not degrade fully after 26 weeks in composting conditions.

Example 5 which incorporates some ethylene-acrylate copolymer into the predominantly PLA core layer and the predominantly iPET metal-receiving layer also shows significantly better moisture barrier than Comparative Example 2. However, Example 5 does not degrade fully after 26 weeks in composting conditions.

Examples 6-8 incorporate an amount of amorphous PLA blended with the iPET as the metal-receiving layer. At a nominal 10 wt % PLA blend with 90 wt % iPET of the metal-receiving layer (C), Example 6's moisture barrier is still significantly improved vs Comparative Example 2; however, Example 6 does not fully degrade after 26 weeks in composting conditions, although some degradability is noted. Example 8, which incorporated a larger percentage of PLA blended with the iPET metal-receiving layer (nominal 50 wt % amorphous PLA with nominal 50 wt % iPET), showed better moisture barrier results than Comparative Example 2, although not as good as the other Examples in which the amount of PLA blended with the iPET was 10 wt % or less. Additionally, Example 8 was substantially degraded and gone within 26 weeks in composting conditions. Example 7 which incorporated an even larger percentage of PLA blended with the iPET metal-receiving layer (nominal 65 wt % amorphous PLA with nominal 35 wt % iPET) exhibited severe processing issues during film-making such that a film sample could not be suitably produced for metallizing. However, it is believed that such as sample would degrade under composting conditions based on the results of Example 8 which used a lesser amount of amorphous PLA blended with the iPET for the metal-receiving layer.

Example 9 replaced the iPET of Layer (C) with a different amorphous polyethylene terephthalate PETG copolyester. Moisture barrier results are also significantly improved over Comparative Example 2 and are comparable to the Examples using iPET as Layer (C). However, similar to the other Examples using iPET as Layer (C) by itself, Example 9 did not fully degrade after 26 weeks in composting conditions.

Example 10 used a very thin layer of iPET as Layer (C), half the thickness of Example 1. Moisture barrier results were significantly better than Comparative Example 2 and comparable to the other Examples. Moreover, the thin layer of iPET of this Example help maintain degradability properties; after 26 weeks in composting conditions, this Example was substantially gone.

Figure 4A:
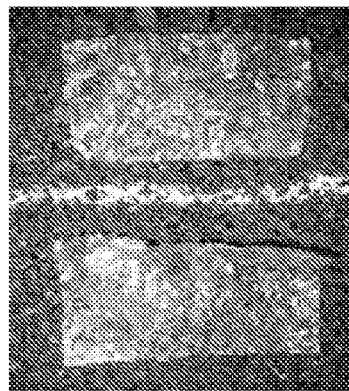
FIGS. 4A, 4B, 4C, 4D, and 4E are photographs that illustrate selected Examples after compostability testing substantially in accordance with ASTM D6400 for "Compostable Plastics" after 3 and 21 weeks of exposure to composting conditions.
Figure 4A:
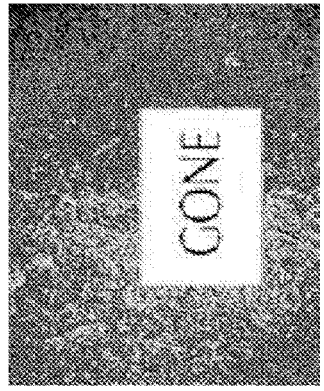
Figure 4B:
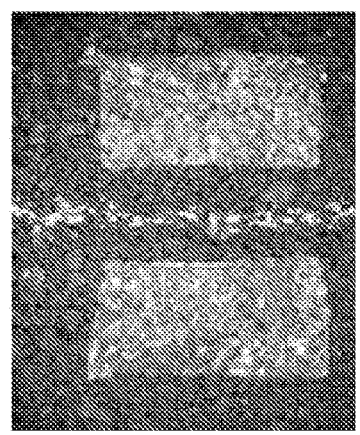
Figure 4B:
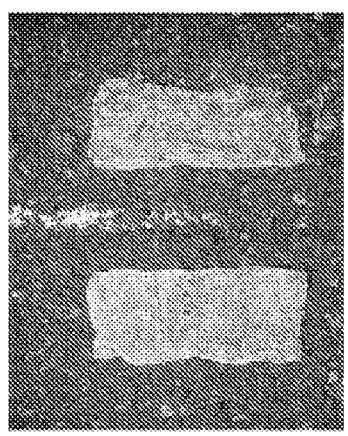
Figure 4C:
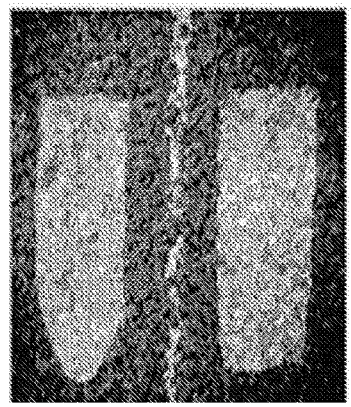
Figure 4C:
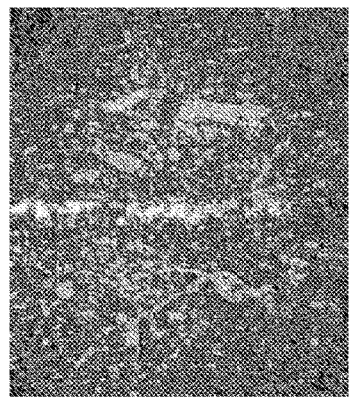
Figure 4D:
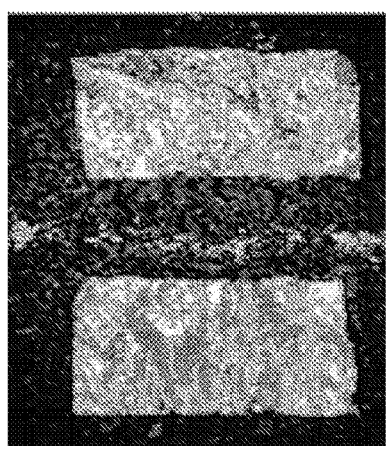
Figure 4D:
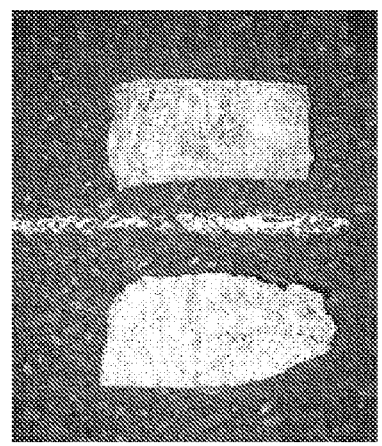
Figure 4E:
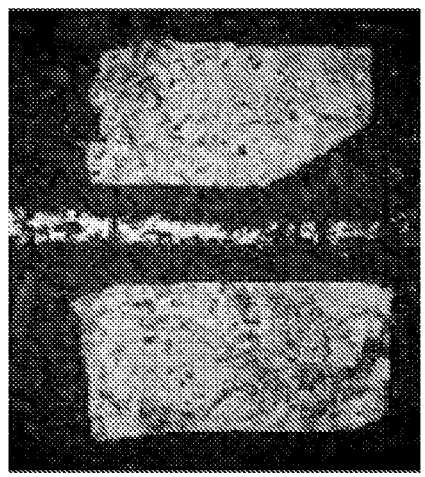
Figure 4E:
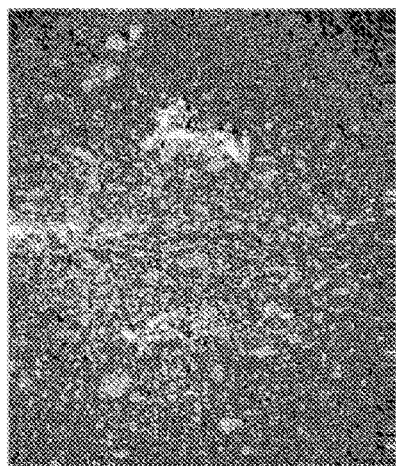

FIGS. 4A (Comparative Example 2), 4B (Example 1), 4C (Example 10), 4D (Example 6), and 4E (Example 8) illustrate degradability of selected Examples. These Figures show the selected Example after 3 weeks exposure to composting conditions and after 21 weeks exposure of the 26 week long test.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A multilayer film comprising (i) a core layer comprising a major fraction by weight of the core layer of a poly(hydroxy acid), (ii) a polymeric barrier receiving layer adjacent to one side of the core layer and comprising amorphous poly(hydroxy acid) blended with an amorphous aromatic copolyester in which a major fraction by weight of the polymeric barrier receiving layer is amorphous aromatic copolyester, and (iii) a barrier layer adjacent the polymeric barrier receiving layer opposite the core layer, the barrier layer comprising an inorganic compound as a major fraction by weight of the barrier layer,
in which the poly(hydroxy acid) is at least about 85% by weight of the total in the multilayer film of the poly(hydroxy acid) and the amorphous aromatic copolyester.

2. The multilayer film of claim 1 in which the amount of amorphous poly(hydroxy acid) is about 10 wt % to 50 wt % and the amorphous aromatic copolyester is about 50 wt % to 90 wt % of the polymeric barrier receiving layer.

3. The multilayer film of claim 1 in which crystallinity of the amorphous aromatic copolyester is at most about 10%.

4. The multilayer film of claim 3 in which the amorphous aromatic copolyester is a copolymer comprising first repeating units of an ethylene isophthalate moiety and second repeating units of an ethylene terephthalate moiety.

5. The multilayer film of claim 1 in which the inorganic compound is selected from the group consisting of Al, Mg, Zn, Sn, Ni, Ti, Si, C, an oxide, carbide, nitride, alloy of these elements, and a mixture thereof.

6. The multilayer film of claim 5 in which the inorganic compound is selected from the group consisting of aluminum, aluminum-metal element alloy, aluminum oxide, silicon oxide and a mixture thereof.

7. The multilayer film of claim 5 further comprising a metal seeding layer positioned between and in direct contact with both of the polymeric barrier receiving layer and the barrier layer, in which the inorganic compound of the barrier layer is aluminum, and in which the metal seeding layer consists essentially of a seeding metal present in amount of about 0.1-0.5 mg/m$^2$, the seeding metal being selected from the group consisting of Cu, Ni and a mixture thereof.

8. The multilayer film of claim 1 which further comprises on a side of the film opposite the barrier layer at least one additional layer of which the farthest from the core layer is a heat seal layer comprising a major fraction by weight of the heat seal layer of an amorphous polyester having at most about 10% crystallinity.

9. The multilayer film of claim 8 in which the amorphous polyester of the heat seal layer is selected from the group consisting of a polyhydroxy acid, an aromatic copolyester and a blend thereof.

10. The multilayer film of claim 9 in which the amorphous polyester of the heat seal layer is a polyhydroxy acid.

11. The multilayer film of claim 10 in which the heat seal layer consists essentially of a polyhydroxy acid and an antiblock additive.

12. The multilayer film of claim 9 in which the amorphous polyester of the heat seal layer is the same as any amorphous aromatic copolyester of the polymeric barrier receiving layer.

13. The multilayer film of claim 8 in which at least one of the polymeric barrier receiving layer and the core layer further comprises an ethylene copolymer effective to compatibilize polyhydroxy acid with aromatic polyester.

14. The multilayer film of claim 13 in which the ethylene copolymer comprises copolymerized ethylene and butyl acrylate.

15. The multilayer film of claim 8 in which the heat seal layer consists essentially of amorphous aromatic copolymer and an antiblock additive.

16. The multilayer film of claim 1 in which the core layer is free of amorphous aromatic copolyester.

17. A multilayer film comprising (i) a core layer comprising a major fraction by weight of the core layer of a poly(hydroxy acid), (ii) a polymeric barrier receiving layer adjacent to one side of the core layer and comprising a major fraction by weight of the polymeric barrier receiving layer of an amorphous aromatic copolyester, (iii) a barrier layer adjacent the polymeric barrier receiving layer opposite the core layer, the barrier layer comprising an inorganic compound as a major fraction by weight of the barrier layer, and (iv) on a side of the film opposite the barrier layer at least one additional layer of which the farthest from the core layer is a heat seal layer comprising a major fraction by weight of the heat seal layer of an amorphous polyester having at most about 10% crystallinity and being selected from the group consisting of a polyhydroxy acid, an amorphous aromatic copolyester which is the same as any amorphous aromatic copolyester of the polymeric barrier receiving layer and a blend thereof, in which the poly(hydroxy acid) is at least about 85% by weight of the total in the multilayer film of the poly(hydroxy acid) and the amorphous aromatic copolyester.

* * * * *